Dec. 25, 1945.　　　　E. M. FISK　　　　2,391,402
TWO-STROKE CYCLE INTERNAL-COMBUSTION ENGINE
Original Filed May 19, 1941　　2 Sheets—Sheet 1
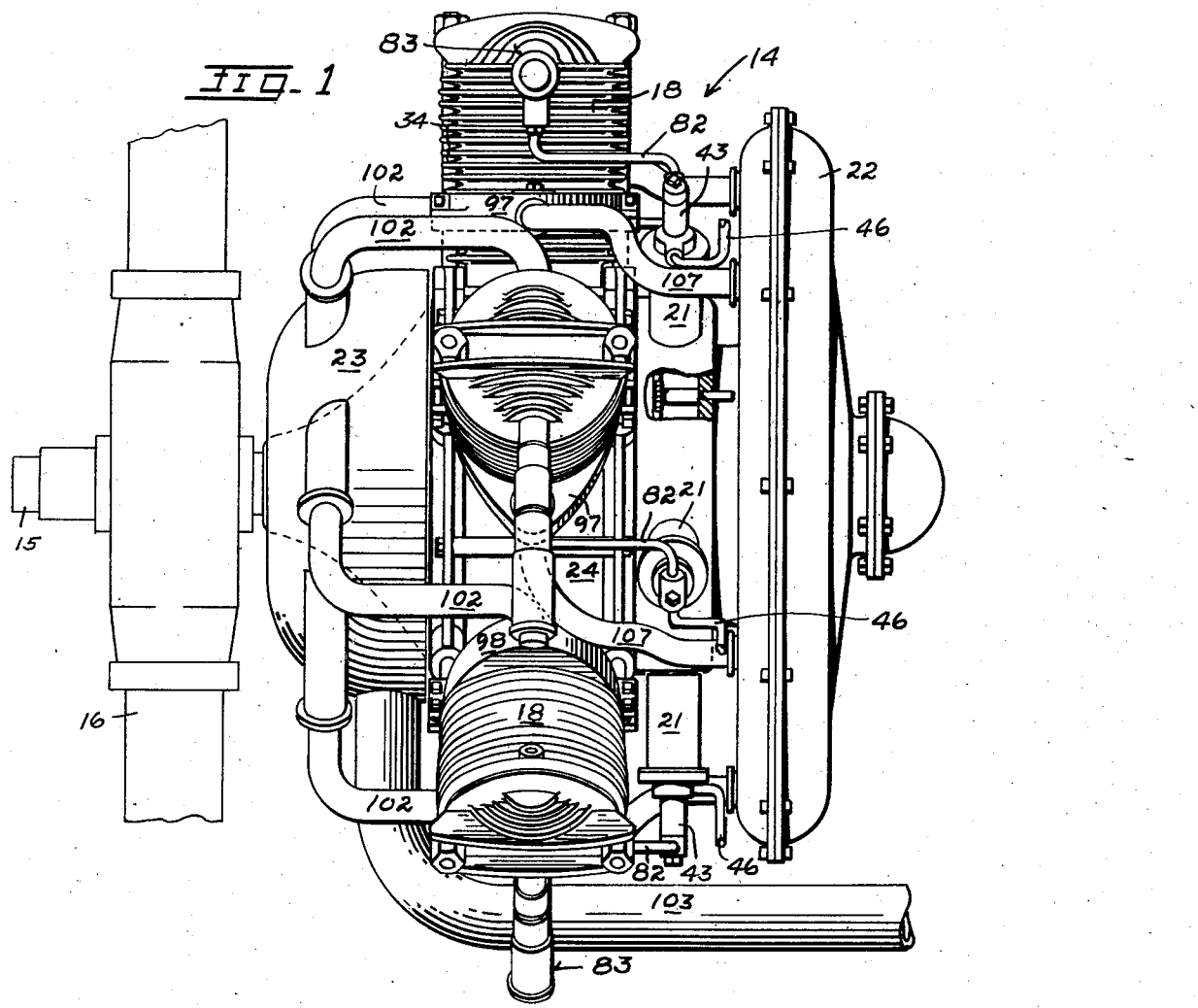
INVENTOR
EDWIN M. FISK
BY Henry N. Young
ATTORNEY Dec. 25, 1945.  E. M. FISK  2,391,402
TWO-STROKE CYCLE INTERNAL-COMBUSTION ENGINE
Original Filed May 19, 1941   2 Sheets-Sheet 2
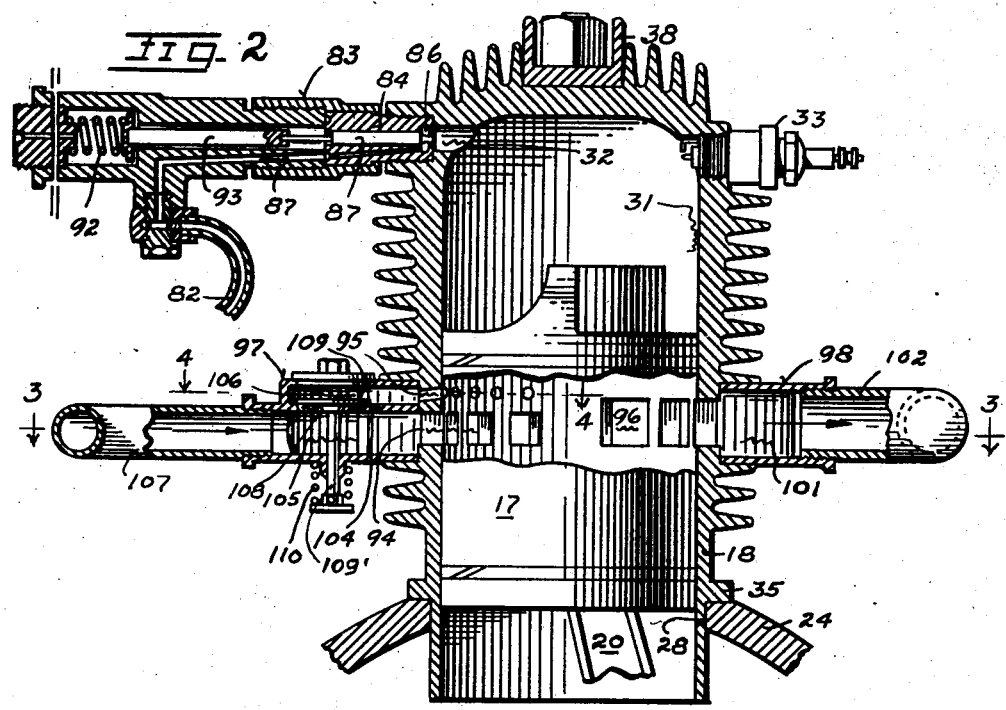
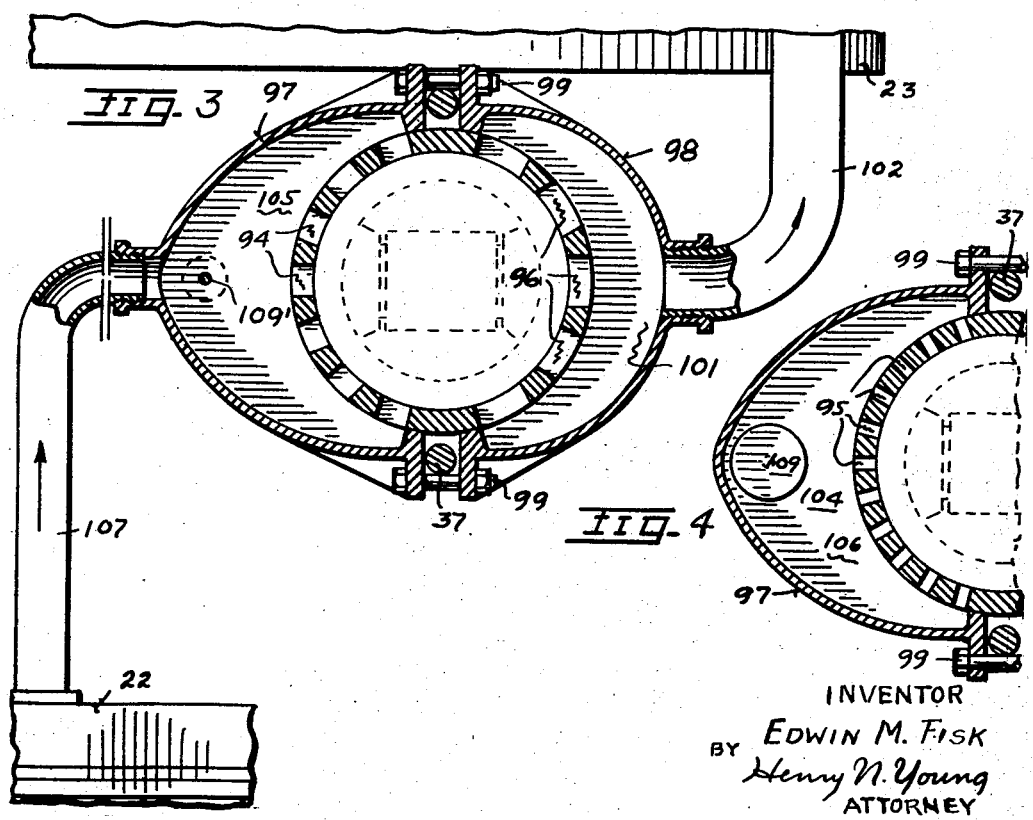
INVENTOR
BY EDWIN M. FISK
Henry N. Young
ATTORNEY Patented Dec. 25, 1945

2,391,402

UNITED STATES PATENT OFFICE 2,391,402

TWO-STROKE CYCLE INTERNAL-COMBUSTION ENGINE

Edwin M. Fisk, Mission San Jose, Calif.

Original application May 19, 1941, Serial No. 394,097, now Patent No. 2,334,185, dated November 16, 1943. Divided and this application November 15, 1943, Serial No. 510,353

4 Claims. (Cl. 123—65)

The invention relates to the fluid input and exhaust control for a two-stroke cycle internal combustion engine, and this application comprises a division of my copending application Serial No. 394,097 filed May 19, 1941, which application issued into Patent No. 2,334,185 on November 16, 1943.

An object of the invention is to provide an improved means for supplying air within an engine cylinder as required for supporting the combustion of the fuel therein.

A more specific object is to provide a particularly effective automatic control of the air input to an engine cylinder for providing an efficient combustion of fuel and scavenging of the combustion products at different working speeds for the engine.

Another object is to provide an improved air control of the class described which is particularly applicable and valuable in a Diesel cycle engine.

The invention possesses other objects and features of advantage, some of which, with the foregoing, will be set forth or be apparent in the following description of a typical embodiment thereof, and in the accompanying drawings, in which, Figure 1 is a side elevation of a radial type two-stroke cycle engine in which the present features of invention are embodied.

Figure 2 is a fragmentary section taken through the axis of a cylinder and in the plane of the cylinders.

Figure 3 is a section at the line 3—3 in Figure 2.

Figure 4 is a fragmentary section at the line 4—4 in Figure 2.

For purposes of illustration, the features of present invention are incorporated in the structure of a radial Diesel-cycle engine 14 which is particularly arranged for use in the propulsion of an aeronautic vehicle. A crankshaft 15 carries a propeller 16 and is arranged to be driven by pistons 17 operative in cylinders 18 which radiate from the crankshaft axis and are connected to the same throw offset or crankpin of the shaft by connecting rods 20, the cylinders being disposed in a common plane perpendicular to the crankshaft axis. The present engine assembly includes fuel pumps 21 and an air compressor 22 for respectively supplying fuel and air to the cylinders, these elements being provided at the opposite end of the engine from the propeller 16. An exhaust manifold 23 is provided at the forward end of the engine and behind the propeller 16.

The present crank case assembly comprises a generally drum-shaped structure including a tubular peripheral wall 24 coaxial with the shaft axis, and forward and rear end walls which mount the shaft in suitable anti-friction bearings provided at axial openings therethrough, said walls being cooperative to define the closed crankcase space in which the crankpin of the shaft is operative. At spaced points thereabout laterally of the zone of action of the crankpin, the peripheral crankcase wall 24 is provided with cylinder-receiving openings having their axes radial to the shaft axis, mutually coplanar, and equally spaced in their line, said openings being arranged to slidably and closely receive inner end portions of the cylinders 18.

The cylinders 18 are preferably so secured in place, as by the means shown and described in detail in my aforesaid Patent 2,334,185, that the firing of fuel charges therein does not produce tensional strains radially of the engine in either the cylinder or crankcase members. As particularly shown, the cylinders 18 comprise like one-piece structures provided with bores having more or less convex closed outer end portions near which radial fuel input ports 32 are provided. Electric ignition plugs 33 may be provided at the outer ends of the cylinder bores, this providing for the necessary ignition for a starting of the engine while cold. The head end of each piston 17 is appropriately shaped for cooperation with the opposed head end of the cylinder cavity to provide the required head clearance, to facilitate the scavenging of combustion products, and to effect a desirable turbulence of the supplied air to intimately mix it with the injected fuel. Externally thereof, each cylinder 18 is provided at its sides and head end with heat-radiating ribs or fins 34, the present cylinders being thereby arranged for air cooling.

In the present five-cylinder Diesel-type engine, the fuel pumps 21 are operated from the shaft 15 for effecting the delivery of charges of atomized fuel to the different cylinders, said pumps being mounted on the crankcase wall 24. Each pump 21 comprises a piston or plunger operative in a uniform bore provided in a pump body or barrel 43. A spring-pressed check valve is provided at the discharge end of the barrel bore, and an input duct extends radially to an intermediate point of the bore through the body 43 for connection with a suitable source (not shown) of liquid fuel through a connecting tube 46.

Understanding that the amount of liquid fuel to be discharged from the pump 21 is determined by the distance of working projection of the pump piston beyond the discharge point of the input duct, and that the size of a charge must be variable to meet varying load and speed conditions for the engine, means are provided for varying the charge delivered from the pump 21, adjustment being made at the will of an operator and while the engine is operating to provide the throttle control for the engine. The present piston-actuating means is such that the piston stroke is the same for all of the fuel charges to be provided by the pump, the position of the stroke range in the barrel bore being adjustably varied rather than the actual length of piston stroke. The present pump 21 and its operating and control means are described in detail in my copending application, Serial No. 510,354, filed Nov. 15, 1943, said application also comprising a division of the aforesaid application, Serial No. 394,097.

A charge of liquid fuel from a pump 21 is delivered through a pipe or tube 82 to a nozzle 83 which terminates in a tip member 84 fixedly (threadedly) mounted in the fuel injection port 32 of a cylinder 18 for delivering an atomized spray of the liquid fuel within the head end of the cylinder while supporting the nozzle assembly on the cylinder. At its forward end, the nozzle tip member 84 is provided with a conically flaring discharge outlet extending from a chamber 86 which is arranged to receive the fuel in liquid form through a duct 87 of the nozzle body and tip and connected to the tube 82.

The present tip member 84 is provided with an axial bore which slidably carries a cylindrical member 89 having a tapered forward needle point head which extends axially through the fuel discharge outlet beyond the chamber 86 as a combined valve and atomizing tip thereat. A spring 92 is operative in the nozzle body through a thrust rod 93 axially engaging the valve member 89 to urge and normally maintain a limiting forward and port-closing engagement of the valve with the inner end of the nozzle outlet. When a charge of liquid fuel is forced into the chamber 86, the resulting pressure therein is operative to unseat the valve 89 and so permit the escape of the full charge into the cylinder in atomized form. The structure and operative features of the nozzle 83 are more fully described in my copending application Serial No. 510,356, filed Nov. 15, 1943, which is specifically directed thereto.

Referring to the structure and functioning of the pistons 17, it will be noted that each said piston is operative as a slide valve with respect to sets of air inlet ports 94 and 95 and sets of exhaust ports 96 provided in the cylinder walls and arranged to be opened only when the piston is at or near the end of its working stroke, the ports of the various sets thereof are aligned circumferentially of the cylinder whereby each set of ports is operative as a single port having a relatively wide mouth, and may be so referred to. The air inlet ports 94 and 95 are provided at the opposite side of the cylinder side wall from the exhaust port 96, and said inlet and exhaust ports are respectively connected with an air supply member 97 and a member 98 providing an exhaust-receiving chamber. The present members 97 and 98 are generally C-shaped to complementarily receive the cylinder between them, and are removably clamped to the cylinder by means of bolts 99 connecting ears provided at their opposed extremities, the members being mutually coplanar when mounted on the cylinder.

The exhaust ports 96 are centered with respect to the chamber 101 of the exhaust member 98, and pipes 102 connect each said chamber of the different cylinders with the exhaust manifold 23 at the front of the engine, the combustion products being discharged from the manifold 23 rearwardly and beneath the engine through an exhaust pipe 103. The space of the air supply member 97 is divided transversely of the cylinder axis by a partition 104 to define chambers 105 and 106 which respectively register at their open inner sides with the air inlet ports 94 and 95. The set of ports 94 is closer to the engine axis than the set of ports 95, and the former set of ports provides an effective air inlet to the cylinder which is appreciably larger than the effective inlet provided by the set of ports 95.

The head end of the piston 17 is so shaped with respect to the relative locations of the ports 94 and 95 and 96 that, as the piston moves toward the end of its working stroke, the air inlet port 95 is opened before the exhaust port 96 is opened, while the air inlet port 94 is opened last; as a compression stroke is started, the closing of the ports 94 and 96 and 95 is effected in that order. Each air supply chamber 105 is connected by a pipe 107 with the discharge side of the compressor 22 for providing air at a constant and predetermined pressure for its discharge through the ports 94 and 95 while the latter are uncovered by the piston. The skirt portion of the piston is long enough to prevent an opening of the ports to the crankcase space. The partition 104 between the chambers 105 and 106 is provided with a port 108 connecting the chambers and arranged to be closed by a spring-pressed disc valve 109 except when the pressure in the chamber 106 is somewhat less than that in the chamber 105.

As the piston 17 approaches the end of its working stroke and uncovers the port 95, the cylinder pressure will act in the chamber 106 to hold the valve 109 shut against the supply pressure in the chamber 105. When the exhaust port 96 is uncovered, the cylinder pressure is relieved and will finally become less than that of the air supply pressure in the chamber 105, whereupon air may then flow into the cylinder through the ports 94 or 95 which are uncovered by the piston. On the return stroke of the piston, air may be supplied to the cylinder through the ports 94 and 95 while these ports are uncovered. Since the port 95 is arranged to stay open after the exhaust port 96 is closed, the air intake for the cylinder through the port 95 is arranged to cease only when the increasing cylinder pressure of compression reaches a value which is slightly less than the air supply pressure by an amount which is determined by the strength of a spring 110 which urges the seating of the disc valve 109 by acting on its stem 109'. The auxiliary and final air intake for the cylinder through the port 95 is arranged to supply a supercharging amount of combustion-supporting air within the cylinder for its compression and mixing with the fuel at the head end of the cylinder.

Referring more particularly to the form of the head end portion of the piston 17, it will be noted that the piston part which is to operate as a slide valve with respect to the air inlet ports 94 and 95 is, in effect, notched out across the piston and from the flat piston extremity for slightly less than half of the piston diameter to provide an end face portion having a cylindrically concave sweep of ninety degrees of arc about an axis perpendicular to the piston axis. The peripheral side edge part of the generally oblique piston end face portion thus provided is arranged to register progressively with openings of the ports 94 and 95 as the piston is reciprocated; during a compression stroke, the openings of the ports 94 and 95 are closed progressively from the ends of their lines, this valve action being reversed during a working stroke of the piston. The opposite piston side is cut away from the piston extremity to provide a cylindrically curved notch of uniform radial cross-section extending substantially half way around the piston and which terminates at substantially the same distance from the extremity of the piston as does the first notch and has its axis of curvature that of the piston; the arrangement is such that the valve action of the piston is the same simultaneously at all of the openings of the line thereof providing the exhaust port 96.

It will be noted that the piston head portion which extends forwardly from between its head end edge parts providing the valve action acts as a baffle to prevent a direct flow of air to the exhaust port 95 from the air inlet ports 94 and/or 95 when the latter ports are open to any degree, and to provide for the completion of exhaust with a minimum escape of fresh air with the exhaust gases. As the present piston moves toward the head end of the cylinder during and following the intake of air therein, its head is particularly effective in providing such a turbulence in the air that the same is quickly mixed with the fuel charge as it enters the cylinder at the end of the compression stroke and at the same cylinder side as the ports 94 and 95, particularly through the action of the curved end face portion of the piston.

From the foregoing description taken in connection with the accompanying drawings, the advantages of the construction and operation of the present devices will be readily understood by those skilled in the art to which this invention appertains. While I have described the features and principles of operation of an assembly which I now consider to comprise a preferred embodiment of my invention, I desire to have it understood that the showing is primarily illustrative, and that such changes may be made, when desired, as fall within the scope of the following claims.

I claim:

1. In a two-stroke cycle internal combustion engine, a cylinder provided intermediate its ends with an exhaust port and a pair of air inlet ports mutually spaced axially of the cylinder, said exhaust and inlet ports being located at opposite sides of the cylinder, a structurally separate member complementarily and sealedly engaging the cylinder side and providing a discharge passage having its intake end in registration with said exhaust port, a structurally separate member complementarily and sealedly engaging the cylinder side opposite the first member and providing a branched air supply passage having the discharge ends of its branches in registration with the different air inlet ports, a check valve in the air supply passage to the inlet port nearest the cylinder head for automatic opening when the pressure at the intake side thereof exceeds the pressure in the cylinder, and means directly cooperative between the members to releasably clamp them to the cylinder.

2. In a two-stroke cycle internal combustion engine, a cylinder provided intermediate its ends and at opposite sides thereof with an exhaust port and inlet ports, and a working piston in the cylinder operative as a valve with respect to said ports and having a diametric baffle portion extending forwardly from between the side portions of the piston which provide the valve action with respect to the different ports, the piston face portion at the inlet port side of the baffle being cylindrically concave about a straight axis perpendicular to the piston axis, and parallel to the chord of the inlet port.

3. In a two-stroke cycle internal combustion engine, a cylinder provided intermediate its ends with an exhaust port and a pair of air inlet ports mutually spaced axially of the cylinder, means operative to introduce the fuel charges solely at the cylinder head, an air pump operated by the engine in such a manner that the pressure of the discharged air varies directly with the speed of operation of the engine, means providing a laterally closed passage connecting the discharge of said air pump with the air inlet port furthest from the cylinder head, means providing a laterally closed passage connecting said first passage with the other inlet port, a normally closed check valve in said last passage for automatic opening to open the passage only when and while the pressure in the first passage exceeds that in the engine cylinder, and a piston in the cylinder operative as a valve with respect to said ports in such a manner that the last-mentioned air inlet port and the exhaust port and the first air inlet port are opened in order during a working stroke of the piston.

4. In a two-stroke cycle internal combustion engine, a cylinder provided intermediate its ends and at opposite sides thereof with circumferentially extending inlet and exhaust ports, and a working piston in the cylinder operative as a valve with respect to said ports and having a diametric baffle portion extending forwardly from between the side portions of the piston which provide the valve action with respect to the different ports, the piston face portion at the inlet port side of the baffle being cylindrically concave about a straight axis perpendicular to the piston axis, and the piston face portion at the exhaust port side of the baffle being cylindrically convex about the piston axis and having its radius less than that of the piston.

EDWIN M. FISK.